United States Patent [19]
Raney

[11] Patent Number: 5,736,957
[45] Date of Patent: Apr. 7, 1998

[54] DELAY COMPENSATED DOPPLER RADAR ALTIMETER

[75] Inventor: Russell Keith Raney, Arnold, Md.

[73] Assignee: The Johns Hopkins University, Baltimore, Md.

[21] Appl. No.: 654,444

[22] Filed: May 28, 1996

Related U.S. Application Data

[60] Provisional application No. 60/000,731 Jun. 30, 1995.

[51] Int. Cl.[6] .................................................. G01S 13/08
[52] U.S. Cl. .................... 342/99; 342/25; 342/120; 342/121; 342/135; 342/191; 342/196
[58] Field of Search ................... 342/25, 99, 120, 342/121, 122, 123, 135, 191, 196

[56] References Cited

U.S. PATENT DOCUMENTS

| | | | |
|---|---|---|---|
| 3,768,096 | 10/1973 | Dentino | 342/25 |
| 4,594,593 | 6/1986 | Nohmi | 342/25 |
| 4,727,373 | 2/1988 | Hoover | 342/25 |
| 4,945,360 | 7/1990 | Trummer et al. | 342/122 |
| 5,170,171 | 12/1992 | Brown | 342/191 |
| 5,179,383 | 1/1993 | Raney et al. | 342/25 |
| 5,189,424 | 2/1993 | Brown | 342/25 |
| 5,260,708 | 11/1993 | Auterman | 342/25 |
| 5,323,162 | 6/1994 | Fujisaka et al. | 342/25 |
| 5,327,140 | 7/1994 | Buckreu | 342/25 |

*Primary Examiner*—John B. Sotomayor
*Attorney, Agent, or Firm*—Eugene J. Pawlikowski; Carla Magda Krivak

[57] ABSTRACT

A delay compensated Doppler radar altimeter which eliminates the relative delay curvature associated with the energy reflected by a scatterer located in the along-track direction of an aerial platform for which a most accurate estimation of scatterer elevation is desired. By Doppler shifting each return, the range indicated for each scatterer over its illumination history is equal to the minimum range $x_h$ experienced when the relative velocity between the aerial radar and the ground is effectively zero. Compensating each signal so that its entire along-track history can be used for elevation estimation leads to an advantage of more than 10 dB in gain improvement over existing systems, and less degradation from surface topography.

17 Claims, 10 Drawing Sheets

The relative radiometric response of the two types of radar altimeters is given by the ratio $$\frac{P_{dD}}{P_{PL}} = \left(\frac{h+R_E}{R_E}\right) \frac{A_{dD}}{A_{PL}}$$

in which it is assumed that all other factors are equal in the two cases.

DELAY COMPENSATED DOPPLER RADAR ALTIMETER

STATEMENT OF GOVERNMENTAL INTEREST

The Government has rights in this invention pursuant to Contract No. N00039-94-C-0001 awarded by the Department of the Navy.

This application claims the benefit of U.S. Provisional application No. 60,000,731, filed Jun. 30, 1995.

BACKGROUND OF THE INVENTION

1. Field of the Invention

The present invention relates to radar altimeters and, particularly, to a radar altimeter which achieves a very high degree of accuracy in topographic mapping of underlying terrain. Through application of a delay/Doppler processing algorithm, all data within the entire illumination footprint of a topographic path may be processed in estimating the elevation of each resolved patch of sub-satellite terrain.

2. Description of the Prior Art

It has been known in polar ice sheet and surface wave monitoring, for example, to use satellite-based observations which can significantly distinguish between such topographical surfaces as may be level, sloping, or even undulating. In principle, conventional radar altimeters could satisfy these requirements, but only if several well-known disadvantages could be overcome when making ice or wave observations. Satellite lasers are another potential candidate, but these also have several debilitating features.

Currently, as just mentioned, there are two approaches to ice sheet altimetry from satellites: radars and lasers. The disadvantages of both of these appear to outweigh their advantages. Ideally, one would prefer to retain the advantages of both lasers and radars, while at the same time circumventing their respective weaknesses.

First proposed nearly 30 years ago for ice sheet monitoring [Robin 1966], radar altimeters enjoy the benefits of cloud penetration and extensive averaging over hundreds of samples for each elevation estimate. Although satellite radar altimetric data since 1978 have contributed substantially to our knowledge of the relatively smooth and level interior plateaus of the Greenland ice cap, instruments that have been optimized for the ocean have several shortcomings when used over surfaces with less benign characteristics [Thomas et al. 1985, Zwally et al. 1987, Partington et al. 1989]. Radar altimeters designed for oceanographic application are capable of elevation precision on the order of several centimeters, but only after extensive averaging over the returns from nominally horizontal and relatively flat surfaces. Their spatial footprint and their differential height discrimination are determined by a convolution of the (compressed) ranging pulse with the surface [Moore and Williams 1957, Brown 1977, McArthur et al. 1989]. Effective pulse-limited footprints, which may be on the order of 1–2 km in diameter over calm water, expand to several kilometers over typical ice sheets, and exhibit unwanted (and generally undetermined) degradation in response to terrain slope and topography. Even for continental ice sheet surfaces, 85% of which have average slopes of less than about 1 degree [Thomas 1990], elevation and footprint errors corrupt the data. For a conventional radar altimeter, the altitude mark corresponds to features that are closest to the instrument. In general, this implies that a prominent terrain feature lying away from the sub-satellite point by several kilometers can dominate the return, leading to an elevation estimation error, and even more troublesome, to uncertainty in footprint location. In rough terrain, the altitude estimation tends to jump discontinuously from hilltop to hilltop.

Satellite-based laser altimetry has been promoted with the prospect of overcoming these substantial disadvantages. The Geoscience Laser Altimeter System (GLAS), for example, is designed to achieve an effective footprint of 70 m in diameter for each pulse, which are spaced 188 m apart along track [GLAS 1992]. Each laser footprint size is relatively independent of terrain characteristics, and its location is known to within about ±150 m. These and related specifications are cited as advantages when compared to conventional radar altimetry, and are defended as justification of laser altimetry over radar altimetry for the global change ice sheet application. There are substantial disadvantages to the laser approach, however. The principal weaknesses are summarized as vulnerability to cloud cover; insufficient data for robust elevation statistics; and loss of data continuity.

Cloud cover statistics for Greenland, the Arctic, and especially Antarctica are incomplete and variable. Records have been accumulated for the Canadian Beaufort Sea that show cloud obscuration or severe overcast ranging from 25% to 50% over coastal regions, with increases in the summer months up to 75% to 100% [Agnew 1987]. Other records, such as those being accumulated by the International Satellite Cloud Climatology Project, show similar elevated cloud cover statistics [Rossow 1992]. On average, cloud obscuration is less severe for Antarctica, although it is known that clouds are common over the seaward margins of the ice shelves and continental sheets [Rossow 1992]. Cloudiness may well increase if global warming progresses. If this should occur, ice sheet observation would assume increased importance, yet laser altimetry would be in further jeopardy. Based on the evidence available, it is impossible to assure adequate visibility of ice sheets over the next several decades from a satellite at the 1.064 μm infrared wavelength of GLAS.

Even with no clouds, and a laser capable of arbitrarily fine range precision, a system such as GLAS cannot provide robust estimates of ice sheet elevation. The principal reason for this is that a laser gathers so few ranging samples. Although the statistical performance to be expected of GLAS might be quantified using a relatively detailed model of the surface, a simple example serves to illustrate the problem. Let the terrain have varying elevation with a standard deviation of 5 meters (with respect to least-mean-square horizontal plane) over an area 1 km square. After two repeat orbit cycles which would lay down parallel tracks about 2 km apart at 83° N/S latitude after one year, approximately 11 elevation samples per square km would be gathered. If all samples were statistically independent (and Gaussian distributed), the standard deviation of the elevation estimate for that area would be $5/\sqrt{11} \approx 1.5$ meters. If the original elevation standard deviation were only 1 meter over the entire square kilometer, which is below the average for most ice sheets [Brooks et al. 1978, Robin, Drewry, and Squire 1983, Zwally 1984, Thomas 1990], the standard deviation of the GLAS derived elevation for that area would be about 30 cm. South of 83° N where the orbit allows fewer samples per square kilometer, the statistical data base becomes even more sparse. Cloud obscuration would make matters worse. It follows that for realistic ice sheet situations, the measurement variance from GLAS for each annual cycle would be significantly larger than the science requirement of ±0.1 m [Robin 1984]. Thus, the statistical robustness of elevation estimates from GLAS would be unsatisfactory for global change ice monitoring.

Cloud cover and unreliable surface sampling statistics are the two chief reasons that the Canadian Ice Centre has discontinued use of laser altimetry for their operation ice surveys in the Arctic.

There is a third significant disadvantage, one which generalizes to any optical elevation estimation technique. Continuity of the data record is essential [Robin 1984, Thomas et al. 1985, Zwally et al. 1987, Partington et al. 1989, van der Veen 1991, Davis 1994, EOS 1994]. Laser altimetry measures the elevation of the reflecting surface which in most cases of ice sheet monitoring is snow. In contrast, radar altimetry reflects primarily from the first surface of dielectric discontinuity, which may lie a meter or more beneath a layer of snow. It follows that lasers and-radars observe different elevations. This means that if the Mission to Planet Earth were to rely on laser technology to monitor polar ice, starting say in 2003, then the heritage of radar altimetric data spanning the 25 years since Seasat would be lost. Furthermore, a record of laser elevation data would not be useful as an archive for comparison with future radar data. Even if optical altimetry currently is in favor, in future, radar could well be preferred, motivated perhaps by increased cloud cover that could shut down laser altimetry. From the perspective of data continuity alone, exclusive reliance on laser altimetric data for global change purposes would seem to be ill-advised.

SUMMARY OF THE INVENTION

To eliminate such drawbacks, the present invention introduces a new concept in radar altimetry which is characterized chiefly by a much smaller and more reliable footprint than has been shown by any previous satellite radar altimeter.

Furthermore, radar altimetry is not hampered by clouds, assures data continuity, and establishes a statistically robust data base. In accordance with the invention, a delay/Doppler radar altimeter operates coherently to retain the relative phase structure within each group of pulses received from each ground scatterer, so that the along-track pulse-to-pulse phase can be exploited. Delay compensation as a function of Doppler is a key feature applied for the first time in an altimeter application. A sequence of many pulses is collected and stored in memory and the time-delay history from each individual scatterer traces out a hyperbolic locus across the data field. A Fast Fourier Transform (FFT) is applied in the along-track direction to the data in memory to transform into the delay/Doppler domain. In this domain, the range curvature describes the relative delay suffered by all signal loci at along-track points with respect to minimal radar range, that is, the equivalent distance from the radar to the scatterer as it appears at zero Doppler, which occurs at nadir. Taking advantage of the fact that the curvature of an altimeter's illuminating wavefront in its along-track direction is a known function of Doppler frequency, this curvature can be fully compensated. Once full compensation is accomplished, all parts of the along-track history from each and every reflection are used for elevation estimation.

Curvature compensation may be applied in several different ways, including interpolation, or range bin address control. One effective means of delay compensation is through multiplication by a known phase function of all data in the delay/Doppler domain. The effect of delay compensation after the range inverse fast Fourier transform is to shift the range position of each and every scatterer to be equal to its minimal range (attained when directly overhead such scatterer) at which point the Doppler frequency is effectively zero.

The significance of effectively transforming the hyperbolic locus along the data field into a surface devoid of along-track curvature is that integration can take place over the entire along-track duration of the signal history. Such total integration, as opposed to analyzing a single circular zone, means that altimeter performance is substantially improved while at the same time increasing the efficiency of the radar itself. Performance improvement is expressed in a smaller footprint size (by about a factor of 10) over other systems, while at the same time the effective amount of averaging is increased, leading to more reliable elevation estimates. Efficiency improvement is a consequence of adding pulses from the entire width of the along-track antenna pattern, rather than just from the small circular zone at the center. Realizing a ten-fold increase (approximately) in the amount of reflected signal energy available for use by the altimeter can be capitalized by reducing the power requirements of the radar.

Delay/Doppler radar compensation devices are not unknown to the art. U.S. Pat. No. 3,768,096 teaches a range curvature compensation for a synthetic aperture radar imaging processing system (SAR). U.S. Pat. No. 5,179,383, of which the Applicant of the present invention appears as an inventor, teaches a SAR system with range curvature correction being accomplished. U.S. Pat. No. 4,594,593 teaches a SAR system having both range curvature compensation and azimuth compensation. U.S. Pat. No. 5,323,162 likewise teaches a SAR system having compensation of the Doppler frequency. However, the subject of Doppler compensation as implemented within a radar altimeter has not been attempted by the prior art.

Accordingly, one object of the invention is to eliminate the disadvantages that plaque satellite pulse-limited ocean sensing altimeters when making polar ice sheet and oceanographic observations.

Another object is to fully compensate the curvature of an altimeter's illuminating wavefront in the along-track direction.

A further object of the invention is to maximize the effective amount of signal integration in a radar altimeter whereby the power requirement of the radar can be reduced.

Still another object is to advance satellite-based altimetry beyond the methods currently used: laser and conventional radar altimeters.

Other objects of the invention will become apparent from the following detailed description of the embodiment of the present invention when taken in conjunction with the appended drawings.

DETAILED DESCRIPTION OF THE PREFERRED EMBODIMENT

Figure 1:
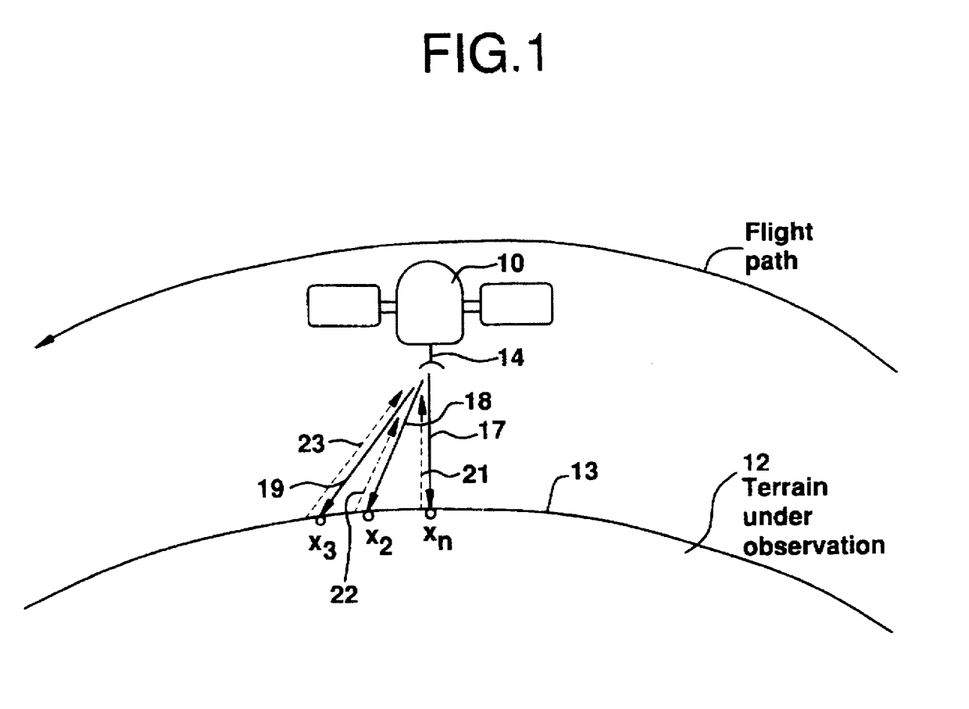
FIG. 1 is a diagrammatic representation of an aerial platform flying over a particular terrain.

Referring to FIG. 1, there is illustrated a view of an aerial platform 10, such as a satellite or high altitude aircraft, flying over a terrain 12 having a reflecting surface 13 whose topographic characteristics are to be determined. The platform 10 is provided with an antenna 14 connected, in turn, to the transmitter and receiver circuits of a radar altimeter (not shown) aboard the platform. Portions of the transmitted beam are identified in FIG. 1 by the numerals 17, 18, 19 whereas the beams returned to antenna 14 are identified by the numerals 21, 22, 23. The radar energy is scattered in all directions once incident on surface 13. To represent the incidence of the transmitted beams 17, 18 and 19 on the surface 13, a plurality of scatterers or spots $x_n$, $x_2$ and $x_3$ are shown lying within the beamwidth of the radiation from antenna 14 and further understood to be lying within the along-track of the platform 10. Such scatterer positions $X_n$, $X_2$, and $X_3$ are intended to show a fraction of the many hundreds if not thousands of scatterers located at different along-track positions and elevations that are simultaneously within the altimeter's field of view.

It will be appreciated from the geometry of FIG. 1 that for the shown position of the platform, the scatterers $X_n$, $X_2$ and $X_3$ are all at slightly different ranges from the platform with the further caveat that the scatterer $X_n$ is at a point directly beneath the platform. It will thus be appreciated that the scatterers $X_n$, $X_2$ and $X_3$ may be distinguished from each other by means of the Doppler shift difference between the echo returns therefrom. In acknowledgement of the fact that zero Doppler shift occurs at nadir, observations of the return from scatterer $X_n$ will show no Doppler variation whereas, with respect to the scatterers $x_2$ and $X_3$, an observation for each will show a Doppler shift in accordance with their delay times relative to the platform as the radar range to the scatterers changes.

Figure 2:
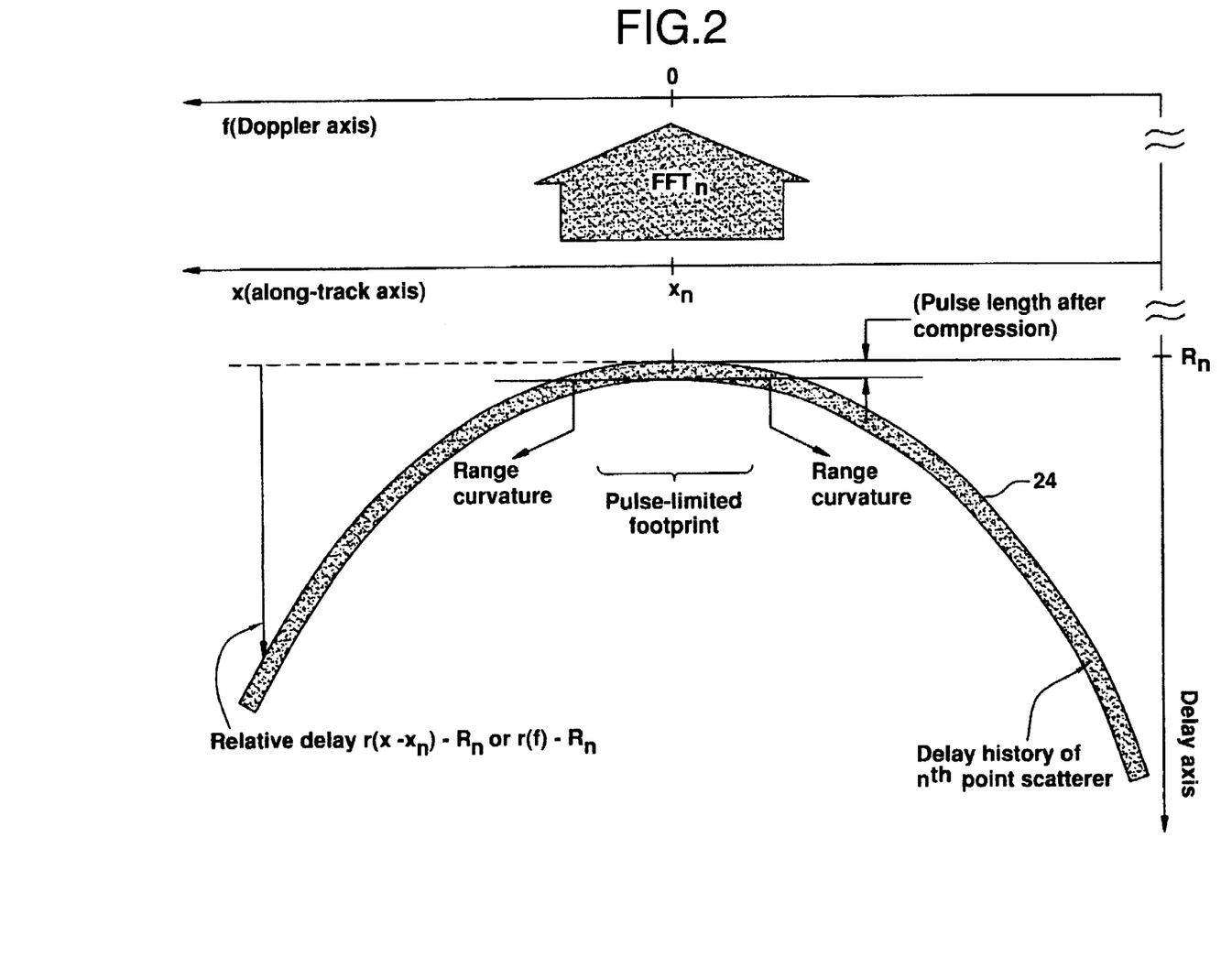
FIG. 2 is a view of the range (delay) history of a scatterer at along-track position $x_n$ as it is scanned by a radar altimeter passing overhead.

The main ideas represented by the configuration illustrated in FIG. 1 are introduced by consideration of the illustration geometry shown in FIG. 2.

Referring to FIG. 2, there is illustrated a view of the delay history of a scatterer at along-track position $X_n$ as it is scanned by an overhead passing altimeter. The objective of an altimeter is to estimate the elevation of reflecting facets along the ground track as it is scanned by the passage of the instrument overhead. In general, geophysical elevation is derived from a record of radar range measurements. Elevation precision is set by the radar pulse length, and by the amount of averaging available for each estimate. Within the context of the parameters of the delay/Doppler altimeter embodying the invention, elevation is defined as the minimum range between the radar and the scatterer.

The signal geometry shown in FIG. 2 shows the relative delay suffered by each signal locus at all points away from minimal radar range, $X_n$, as a function of range delay and relative along-track position x. By definition, a pulse limited altimeter will use only the echo delays from within the pulse-limited footprint to estimate minimum radar range. Both before and after the pulse-limited footprint, the echo from each scatterer appears at relatively greater delay, so that in conventional radar altimeters most of the echoes falling outside of the pulse-limited footprint cannot be used for elevation estimation. Since one object of the invention is a delay/Doppler radar altimeter which operates more efficiently, the object is met by compensating each signal so that its entire along-track history can be used for elevation estimation. Improved geometric robustness over topographically interesting surfaces is another desired feature of the invention and this objective is gained by reliance on knowledge of the zero Doppler geometry, whose along-track position is always at nadir irrespective of surface topography.

It will be appreciated that the relative delay curvature 24 shown in FIG. 2 represents radar range and not the envelope of the transmitted radar pulse. Also, it will be recalled that to achieve delay compensation it is necessary to eliminate the relative delay curvature 24. Only with the elimination of this curvature will the equivalent distance from the radar to the scatterer, over its entire illumination history, be equal to the minimum range. The relative delay $\delta r_n$ for the $n^{th}$ scatterer, given the scatterer's position $x_n$ and (minimal) range $R_n$, is $$\delta r(x-x_n) = R_n\sqrt{1 + \alpha_R \frac{(x-x_n)^2}{R_n^2}} - R_n \qquad (1)$$

$$\approx \frac{\alpha_R}{2R_n}(x-x_n)^2 \qquad (2)$$

where $$\alpha_R = \frac{R_E}{R_E + R_n} \approx \frac{V_B}{V_{S/C}} \qquad (3)$$

in which $R_E$ is the radius of the Earth, $V_B$ is the velocity of the altimeter's antenna illumination along the terrain, and $V_{S/C}$ is the spacecraft orbit velocity. For typical values ($R_n$~800 km, $\alpha_R$~0.89, and (x–$x_n$)<8 km), the relative range delay $\delta r_n$ goes from zero to about 40 m. Although this may not seem like much, it is large when compared to a typical (compressed) range pulse length of 0.5 m. It is essential that this delay be compensated if the entire along-track signal is to be used for elevation estimation with acceptable precision.

The change in relative delay as a function of range is comparatively small. To prove this, the sensitivity of relative delay to a change in elevation may be estimated from $$\frac{\partial \delta r_n}{\partial R_n} = -\frac{\alpha_R(x-x_n)^2}{2} \cdot \frac{1}{R_n^2} \Rightarrow \partial \delta r_n = -\delta r_n \frac{\partial R_n}{R_n} \qquad (4)$$

Using the same numbers as before, the difference in range delay for a 1 km change in elevation $R_n$, say from 800 km to 801 km, is only 40×⅛₀₀~0.5 cm. In similar fashion, it may be shown that the change in relative delay due to the orbital gain term $\alpha_R$ is much less than 1 mm. It follows that an acceptable range delay estimate can be derived with only an approximate knowledge of the scatterer's elevation, and that this value may be held constant during data processing.

Delay compensation implies that the relative delay is removed from the signal over its history. The concept is suggested in FIG. 2. Given that the amount of relative delay is known, and that the signal locus is known, then the relative delay can be compensated completely by subtracting an equivalent amount from the indicated range at all points on the along-track range history. This would lead to the range locus having a constant effective range $R_n$ at all observation opportunities. In other words, curvature of the altimeter illuminating wavefront in its along-track direction is then fully compensated.

Figure 3:
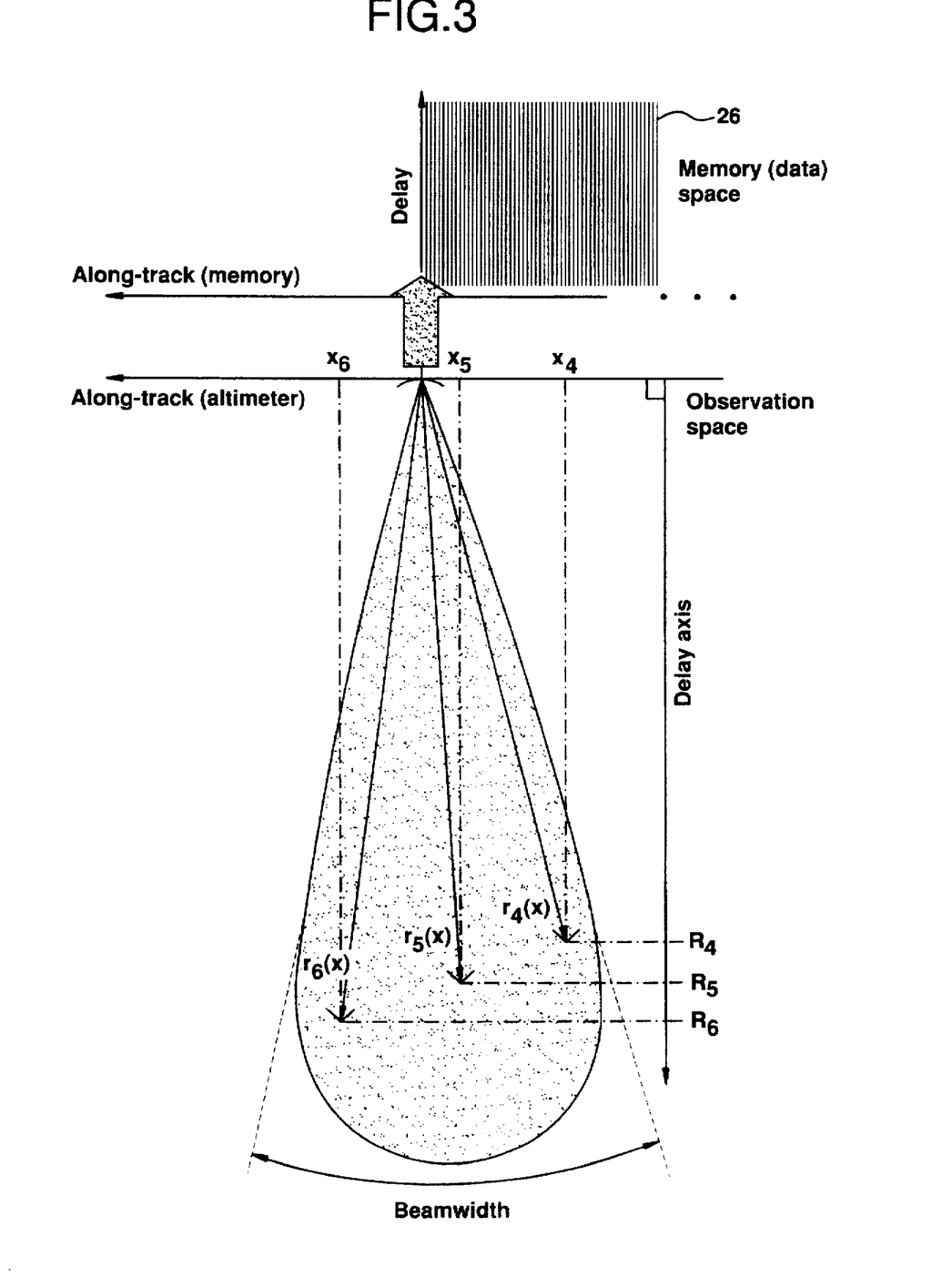
FIG. 3 is a diagram showing the transformation from observation space to memory space for several scatterers simultaneously illuminated by a radar altimeter.
Figure 4:
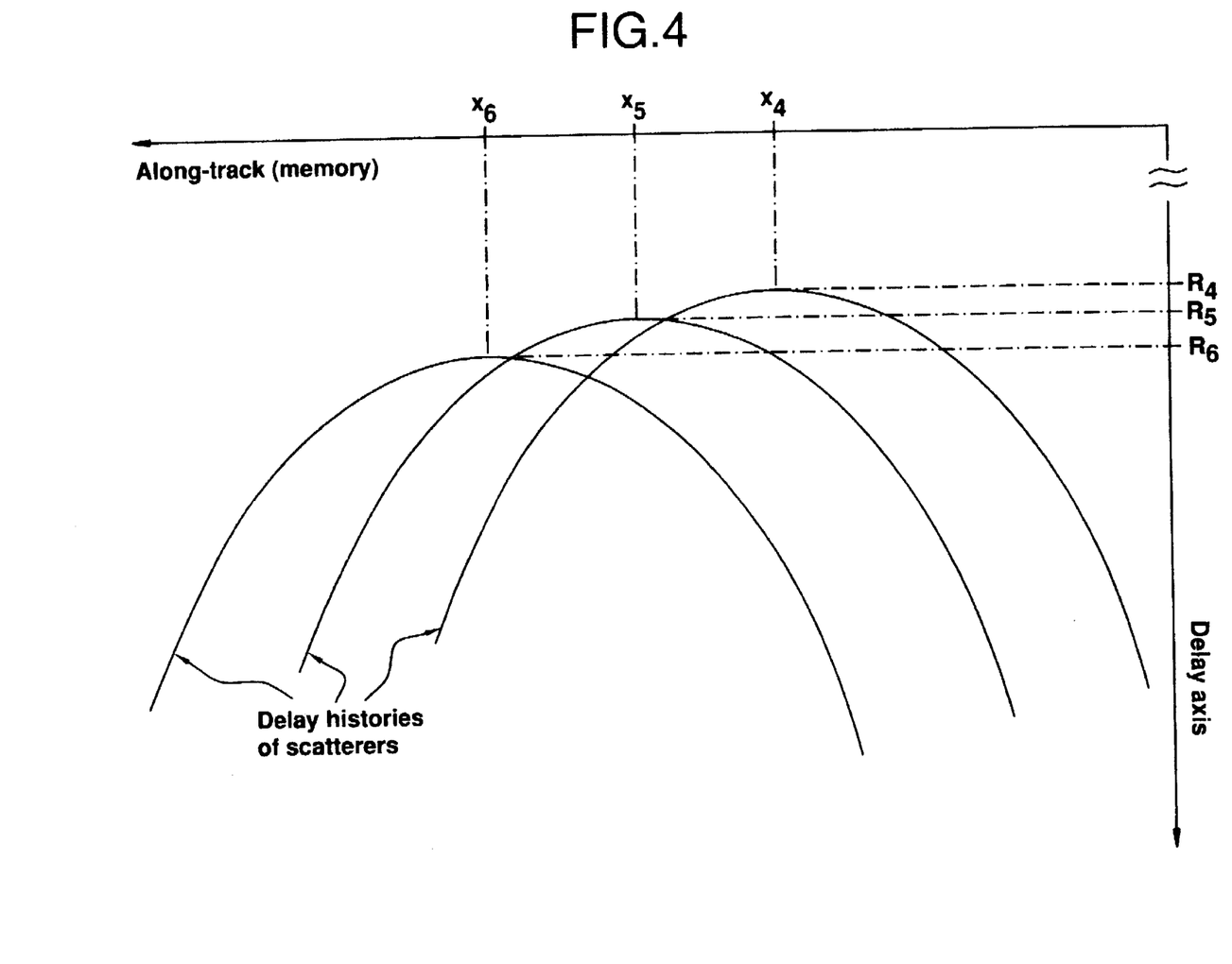
FIG. 4 is a plot of along-track (memory) against delay axis showing delay histories of the scatterers shown in FIG. 3 at different along-track positions and elevations that are simultaneously within the altimeter's field of view.

Unfortunately, it is not possible to apply the delay compensation scheme directly to the received data, because to do so would require knowledge of the along-track position $x_n$ of each scatterer. Even more frustrating, the signal loci from more than one scatterer are present simultaneously in each observed echo. The situation for several scatterers $x_4$, $x_5$, and $x_6$ illuminated simultaneously through antenna 14 so as to have spatial positions identified respectively by the rectilinear coordinates read $(x_4, R_4)$, and $(x_5, R_5)$, and $(x_6, R_6)$ is outlined in FIG. 3. As shown in FIG. 3, echoes are returned simultaneously from all individual scatterers within the illuminated beamwidth of the antenna which is the observation space of the system. For each pulse, these echoes are written together, into a memory 26. After their observation and recording, the range loci appear in memory 26 as shown in FIG. 4. Clearly, at any position in the data field, the delay compensation problem is multiple-valued, for which a single delay compensation will not suffice. Fortunately, these problems may be overcome through application of a suitable data transformation in accordance with the invention.

Figure 5:
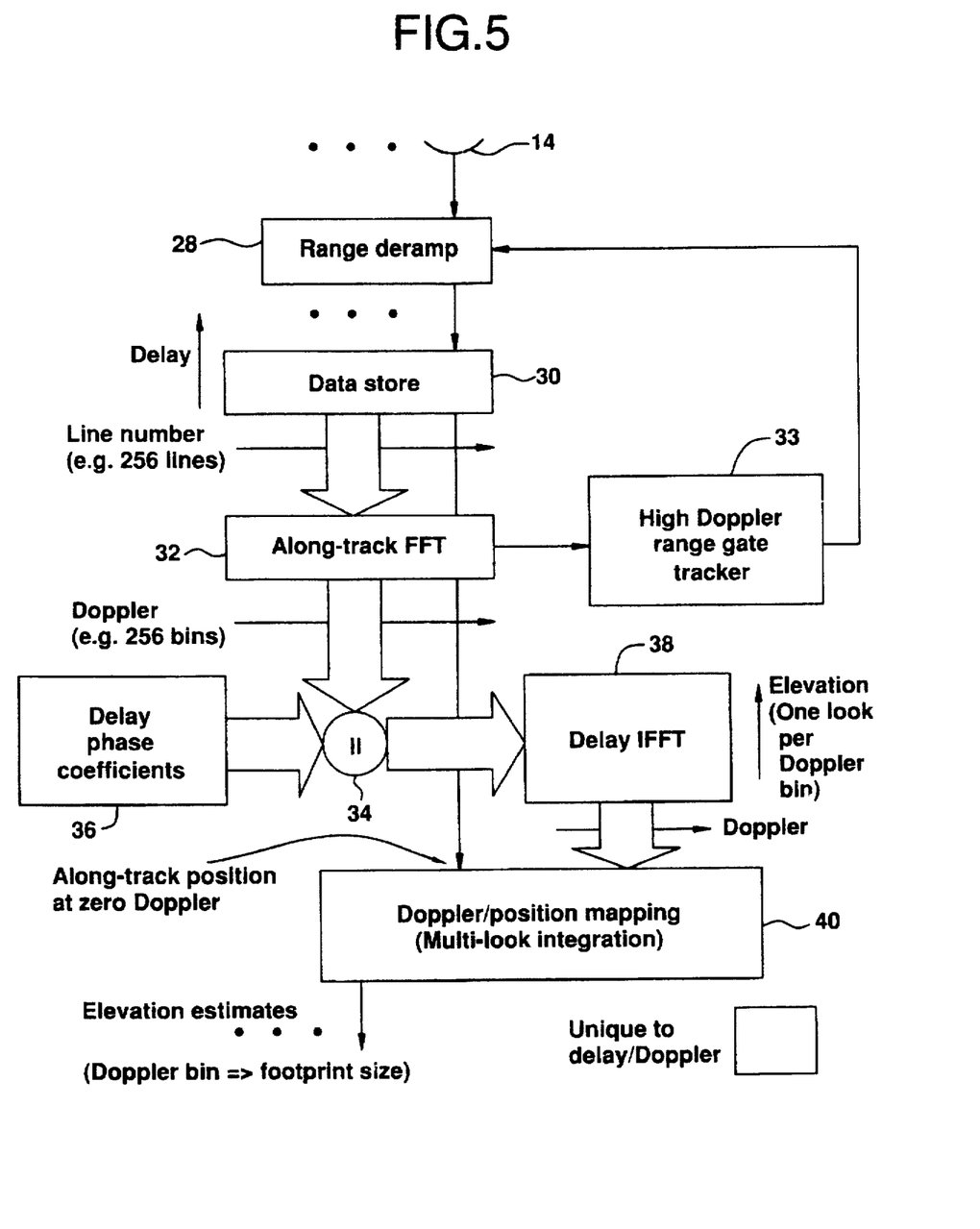
FIG. 5 is a functional block diagram of the processing circuit of the delay compensated doppler radar altimeter embodying the present invention.

Reference is made to FIG. 5 for an understanding of the solution of the multivalued delay compensation problem. In FIG. 5, the block diagram of the principal signal processing stages incorporates an arrangement which includes a range deramp 28, data memory store 30, along-track FFT 32, Doppler range gate tracker 33 connected between FFT 32 and deramp 28, modulator 34 whose inputs include the outputs of FFT 32 and a delay phase coefficients source 36, a delay IFFT 38 which receives the output of modulator 34, and a recorder or multi-look integration device 40 for Doppler/position mapping.

It is well known (Woodward 1953) that application of a Fourier transform $\Im$ to a function p with position shift $\Delta x$ leads to the Fourier transform P of the function, multiplied by a cw phase term whose frequency is proportional to $\Delta$. This Fourier shift theorem applies to the present problem. Let the along-track signal history for each scatterer be $p(x-x_n)$, where $x_n$ is the along-track position of minimum range. Then the Fourier transform $P(f)$, taken with respect to position $x_o$ for the $n^{th}$ scatterer, is $$\Im[p(\chi-\chi_n+\chi_o)] = P(f) \exp\{-j2\pi f(\chi_n-\chi_o)\} \tag{5}$$

where $f$ is frequency in the along-track direction. Thus, a Fourier transform over the ensemble of signal histories yields a set of signal loci for which the relative along-track position of all scatterers has been relegated to cw phase terms. It follows for altimetry data, that the range loci for all signals are single valued in the range/Doppler domain.

For a moving coherent radar illuminating an isolated scatterer, the angle $\alpha_{r,v}$ between the radar relative velocity vector, and the Doppler shift observed along the range vector to the scatterer, are proportional. This is important because Doppler is the frequency revealed by the along-track Fourier transform. The Doppler is given by $$f = \frac{2}{\lambda} \vec{r}(t-t_n) \cdot \vec{V} \Rightarrow f = \frac{2|V|\cos\alpha_{r,v}}{\lambda} \tag{6}$$

In the geometry suitable for satellite altimetry, the Doppler scaling factor is very well approximated by $$f = \frac{2V_{S/C}}{\lambda} \frac{x-x_x}{R_n} \text{ [Hz]} \tag{7}$$

Thus, there is a one-to-one correspondence between the observed Doppler frequency (relative to zero) and an individual scatterer's along-track position (relative to the altimeter's position) at all points along-track.

These two principles open up new possibilities for radar altimetry. Just as FIG. 2 includes the Doppler frequency axis, related to the along-track data axis through a Fourier transform, relative scaling between these two axes is known (the Doppler equivalence theorem). It follows that the required delay compensation is a known and single valued function over the range/Doppler space (Bamler 1992). Furthermore, such compensation may be applied simultaneously to all echoes that were included in the Fourier transform (the Fourier shift theorem). Finally, the spatial position of all scatterers may be deduced from their Doppler histories, since their along-track location $x_n-x_o$ relative to zero Doppler calculated at position $x_o$ for the $n$th scatterer is retained in an along-track phase term. This may be used to map relative along-track scatterer position in a manner analogous to range pulse compression and the IFFT 38 is used to transform cw into position.

The delay increment, in terms of Doppler frequency as its independent variable (Raney et al. 1994), is $$\delta r(f) = \alpha_R \frac{\lambda^2 R_n}{8 V_{S/C}^2} f^2 \tag{8}$$

This delay could be removed by brute force operations on the data in the range/Doppler domain, using integer shifts and an interpolator. However, there is a better way. Recall that the deramped data in the range direction appear as constant frequencies. These may be exploited by applying a constant frequency to offset the extra frequency shift caused by the delay increment. This is implemented by multiplying the data field by the appropriate cw signals in the range direction prior to the range IFFT. The compensation phase multiplier is:

$$\Phi(f,t) = \exp\left\{ +2\pi j k_R \frac{2}{c} \delta r(f) t \right\} \tag{9}$$

where $k_R$ is the linear FM rate of the transmitted signals. The effect of this phase multiplication is to correct the range frequency from each and every scatterer to cw signals that have the same (range) frequency at all Doppler (along-track) positions.

The data at this stage consist of an ensemble of two-dimensional cw signals. For each element, frequency in the range direction is proportional to (minimum) delay relative to the range track point, and frequency in the along-track direction is proportional to the scatterer's along-track position relative to the zero-Doppler position.

Figure 6:
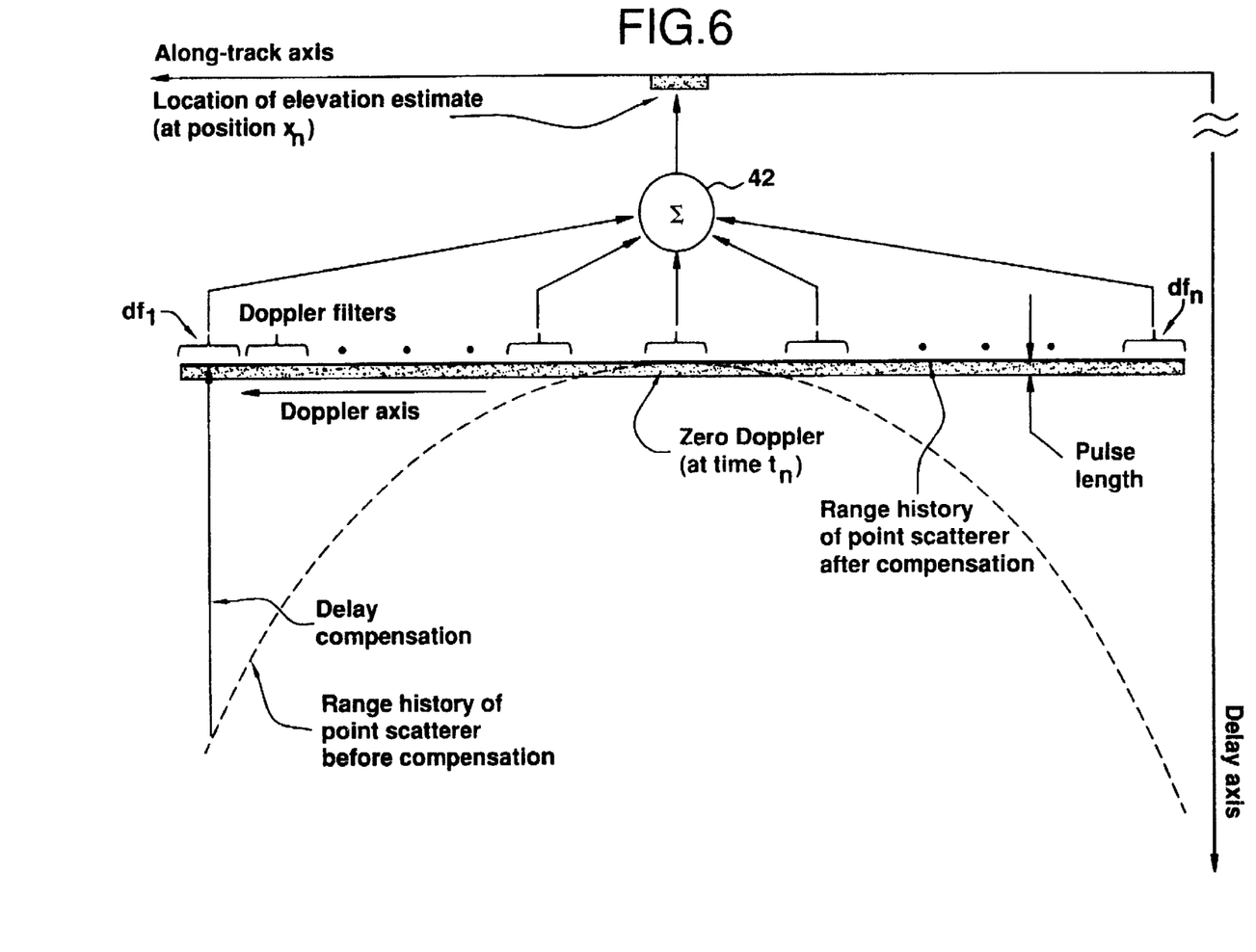
FIG. 6 is a diagram which shows the effects of delay compensation after shifting the range position of all scatterers to equal the minimum range as it appears at zero Doppler frequency.

The remaining data processing for each block consists of a delay IFFT and an along-track IFFT to recover these spatially located data. The process is repeated over subsequent blocks of data, from which multiple looks are available. As the altimeter passes over each scatterer, the corresponding elevation estimates move in sequence from the highest Doppler filter to each lower frequency filter, until the scatterer is out of sight. Reference is thus made to FIG. 6 which shows that the effect of delay compensation is to convert the range delay position of each scatterer to its minimum delay at zero Doppler frequency. As shown in FIG. 6, range estimates from all along-track observations from the Doppler filters $df_1$ to $df_n$ are noncoherently added in summer 42 to complete the elevation estimate for each scatterer. Thus, the final elevation estimate at each along-track position is the result of estimates accumulated in turn from all Doppler filters. If the Doppler filters are designed to span the along-track antenna beamwidth, then all data contribute to the elevation estimates of each resolved along-track position. The along-track impulse response is determined by the Doppler filter weightings. The along-track impulse position is determined by the zero-Doppler position, which is mapped at spacecraft nadir.

To summarize the foregoing description of applicant's preferred embodiment of the invention, the delay/Doppler altimeter of the invention represents a new class of radar altimetry due primarily to the delay compensation algorithm. This algorithm compensates for the along-track component of the incrementally larger range delay suffered by all scatterers when they are not within the beam-limited minimum range footprint. Implementation depends on access to the delay/Doppler domain. In turn, this implies that the pulse-to-pulse data sequence must be coherent, so that a Fourier transform can be used to expose the along-track (Doppler) frequencies. In this domain, the delay curvatures are known, and can be fully compensated by phase multiplication.

Direct results of the delay/Doppler compensation include (1) an increased fraction of the transmitted power used for elevation estimation, (2) an increased geometric precision and stability of the elevation estimation footprint, and (3) an increased amount of averaging for each elevation estimate, leading to reduced estimation variance.

Convenient devices for illustrating more clearly the direct results of the delay/Doppler altimeter of the invention are shown in FIGS. 7a–7b, 8 and 9.

As was explained hereinabove, the delay/Doppler radar altimeter of the present invention uses signal data from the entire length of the antenna illumination pattern in the along-track direction to estimate the elevation of each resolved patch of sub-satellite terrain. This implies that substantially more integration is used in the delay/Doppler altimeter than in a pulse-limited altimeter. Under the assumption that the dominant scattering mechanism is non-specular, the integration gain is linear in power. It follows that the post-processed power for each resolved terrain patch is proportional to the area of the effective footprint that enters the integration. An extra beneficial factor enters, because of the orbital geometry used by satellite altimeters.

The classical radar equation (Purcell 1947, p. 21), including the range time-bandwidth product $T_R B_R$ applicable to pulse compression systems, may be written $$P_R = \frac{P_T G^2(\theta) \lambda^2 (T_R B_R) \sigma}{(4\pi)^3 h^4} \quad (10)$$

where $P_R$=received power $P_T$=transmitted power $G(\theta)$=antenna pattern as a function of angle $\theta$ away from boresight $\lambda$=radar wavelength (m)

h=altimeter altitude (m)

$\delta$=effective radar cross section of the resolved terrain patch (m$^2$)

For altimetry (Moore and Williams 1957, Marth et al. 1993), the radar cross section usually is interpreted to mean $$\sigma = \sigma^\circ A_\sigma \quad (11)$$

where $\sigma^\circ$=normalized scattering coefficient of the terrain (dimensionless)

$A_\theta$=equivalent area of the limiting footprint (m$^2$)

For example, when the altimeter is pulse-limited, the radius $r_{PL}$ of the limiting circle for the flat surface response function is $$r_{PL} = \sqrt{c\tau h} \quad (12)$$

where c=speed of light (~3×10$^8$ ms$^{-1}$)

$\tau$=length of post-processed ranging pulse

The area of the footprint for the pulse-limited altimeter is $$A_{PL} = \pi c \tau h \quad (13)$$

Thus, the effective received power for pulse-limited altimeter is $$P_{PL} = \frac{P_T G^2 \lambda^2 (T_R B_R) \pi c \tau \sigma^0}{(4\pi)^3 h^3} \quad (14)$$

where G is the peak power gain of the antenna.

Figure 7A:
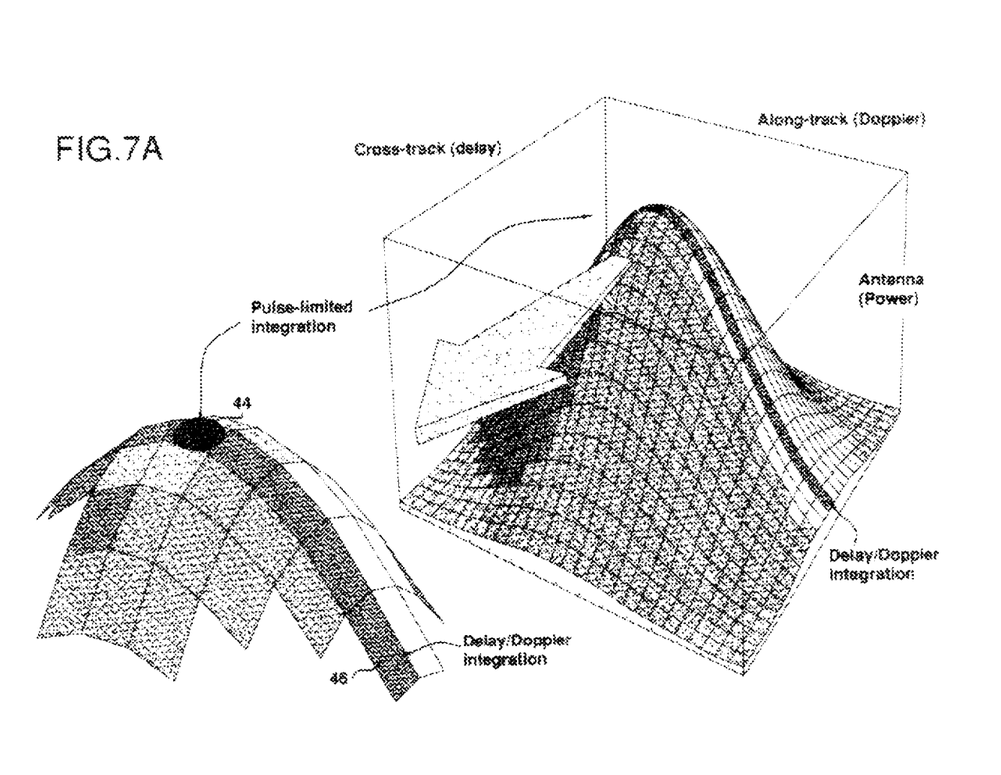
FIGS. 7a and 7b jointly illustrate pulse-limited and delay/Doppler altimeters compared as to respective integration areas.
Figure 7B:
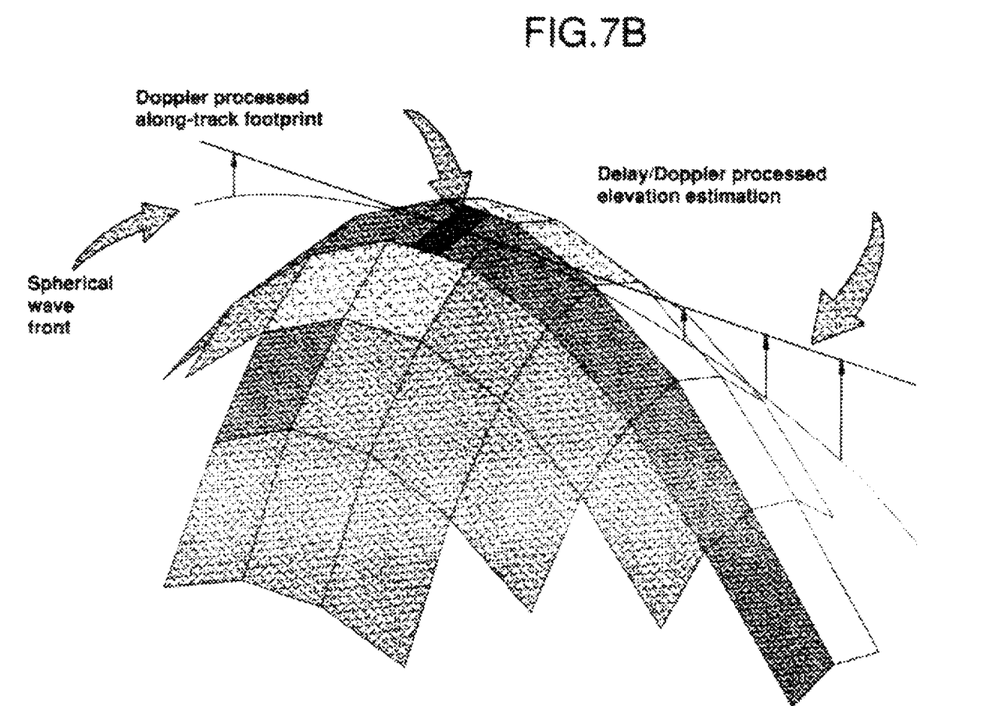

A comparable approach may be extended to represent the case of the delay/Doppler altimeter of the present invention. To do so, it is helpful to visualize the illumination geometry shown in FIGS. 7a and 7b. FIG. 7a shows the central lobe of the power pattern of a typical altimeter antenna, a uniformly illuminated circular aperture of radius a. The far-field pattern is of the form $$G(\theta) = G \left[ 2 \frac{J_1(ak\sin(\theta))}{ak\sin(\theta)} \right]^2 \quad (15)$$

where k is the wavenumber $2\pi/\lambda$, and $J_1(\cdot)$ is the Bessel function of the first kind (Ulaby, Moore, and Fung 1981, p. 130). In FIG. 7a, the pulse-limited area is shown as the darkly shaded circle 44 at the peak of the gain pattern. The region of integration for the delay/Doppler altimeter of the present invention is shown as the lightly shaded along-track draped over the antenna pattern, which is a rectangular area 46 when projected onto the surface. Its width in the range (delay) dimension is given by $2r_{PL}$. Its length may be expressed in relatively simple form as described below.

The innovative feature of the delay/Doppler altimeter of the present feature is that following delay compensation, all reflections from a given scattering area have the same radar range at each and every point in the accumulated signal history. The required compensation is sketched in FIG. 7b. As a consequence, elevation estimation for each scattering area may take advantage of integration over the entire width of the antenna pattern. The data to be integrated may be regarded as an expanded frequency-modulated signal in the along-track direction, in direct analog with the expanded range pulse used on transmission. Delay/Doppler processing thus introduces an along-track time-bandwidth product $T_A B_A$ which appears as a gain factor in the altimeter radar equation. This gain factor operates in conjunction with the along-track spatial resolution, shown in the figure, which is derived through processing over the same Doppler bandwidth $B_A$. It follows from conservation of energy that temporal integration and spatial integration in this situation are logically interchangeable. Thus, the equivalent along-track integration length $L_A$ is proportional to the width $h\beta$ of the antenna footprint, where $\beta$ is the equivalent rectangle width of the antenna pattern. Moreover, the equivalent area $A_{dD}$ that contributes to the received signal power for a delay/Doppler altimeter is $$A_{dD} = 2r_{PL}L_A = 2h\beta \sqrt{c\tau h} \tag{16}$$

In addition, for an orbital system, the integration time is expanded by the ratio of the satellite radius $(h+R_E)$ to the Earth radius $R_E$ (Raney 1991). The corresponding integrated received power for the delay/Doppler altimeter is $$P_{dD} = \frac{P_T G^2(\theta) \lambda^2 (T_R B_R) \sigma^0}{(4\pi)^3 h^{5/2}} \; 2\beta \sqrt{c\tau} \left( \frac{h+R_E}{R_E} \right) \tag{17}$$

which shows an $h^{-5/2}$ altitude (range) dependence.

This result might be expected, at least with respect to the altitude dependence, since it is the geometric mean between the pulse-limited case ($h^{-3}$) and the beam limited case ($h^{-2}$) (Moore and Williams 1957). Furthermore, integration along-track for orbital systems benefits from the relative radii of the orbital path and the path of integration. Beyond these, however, the result shows another effect that is subtle but may be helpful in system optimization: reduced sensitivity to compressed pulse length $\tau$.

The relative radiometric response of the delay/Doppler radar altimeter and a pulse limited altimeter is given by the ratio $$\frac{P_{dD}}{P_{PL}} = \left( \frac{h+R_E}{R_E} \right) \frac{A_{dD}}{A_{PL}} \tag{18}$$

in which it is assumed that all other factors are equal in the two cases. To first order, the relative radiometric advantage of the delay/Doppler altimeter over the pulse-limited altimeter is given simply by the ratio of the applicable footprint areas over which the signals are integrated. The delay/Doppler altimeter makes better use of the transmitted power, expressed through the larger applicable area of integration.

Figure 8:
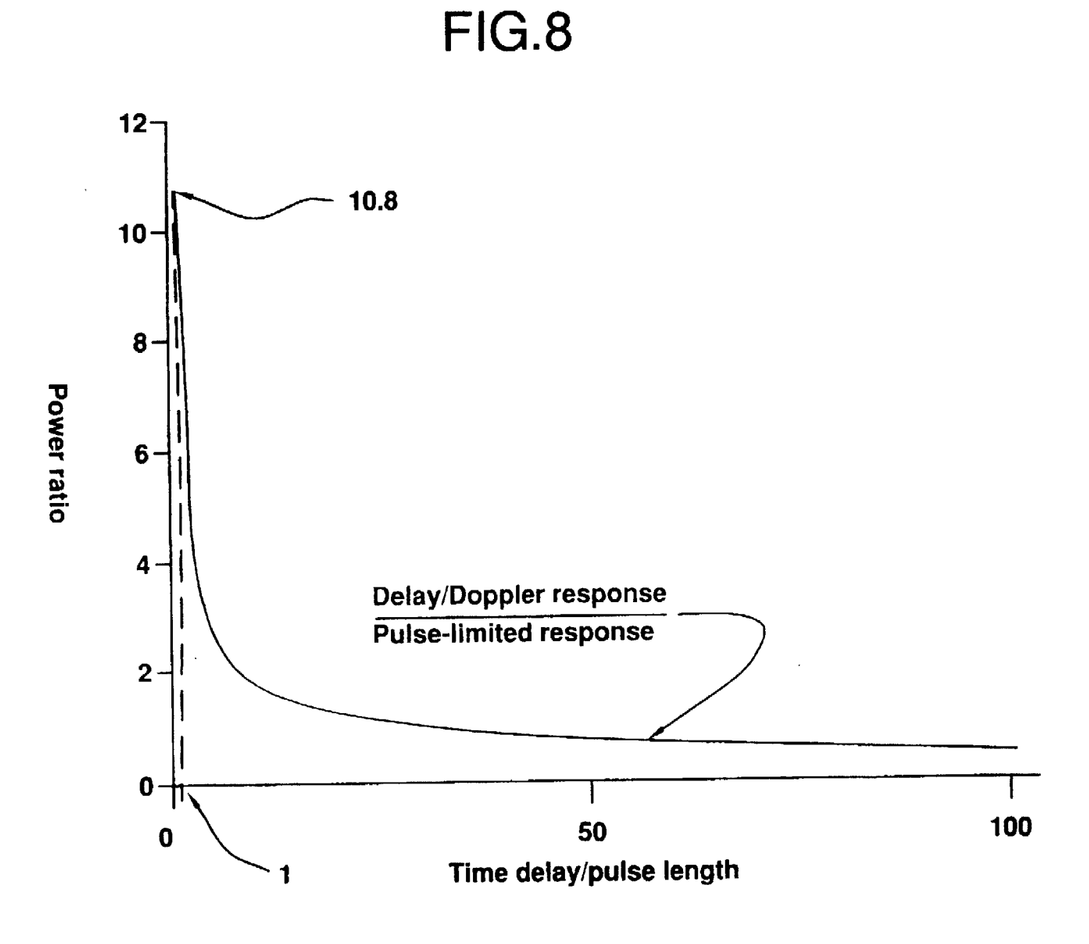
FIG. 8 is a diagram which displays the impulse response of the delay/Doppler altimeter in accordance with invention normalized by response of a pulse limited altimeter using TOPEX parameter values.
Figure 9:
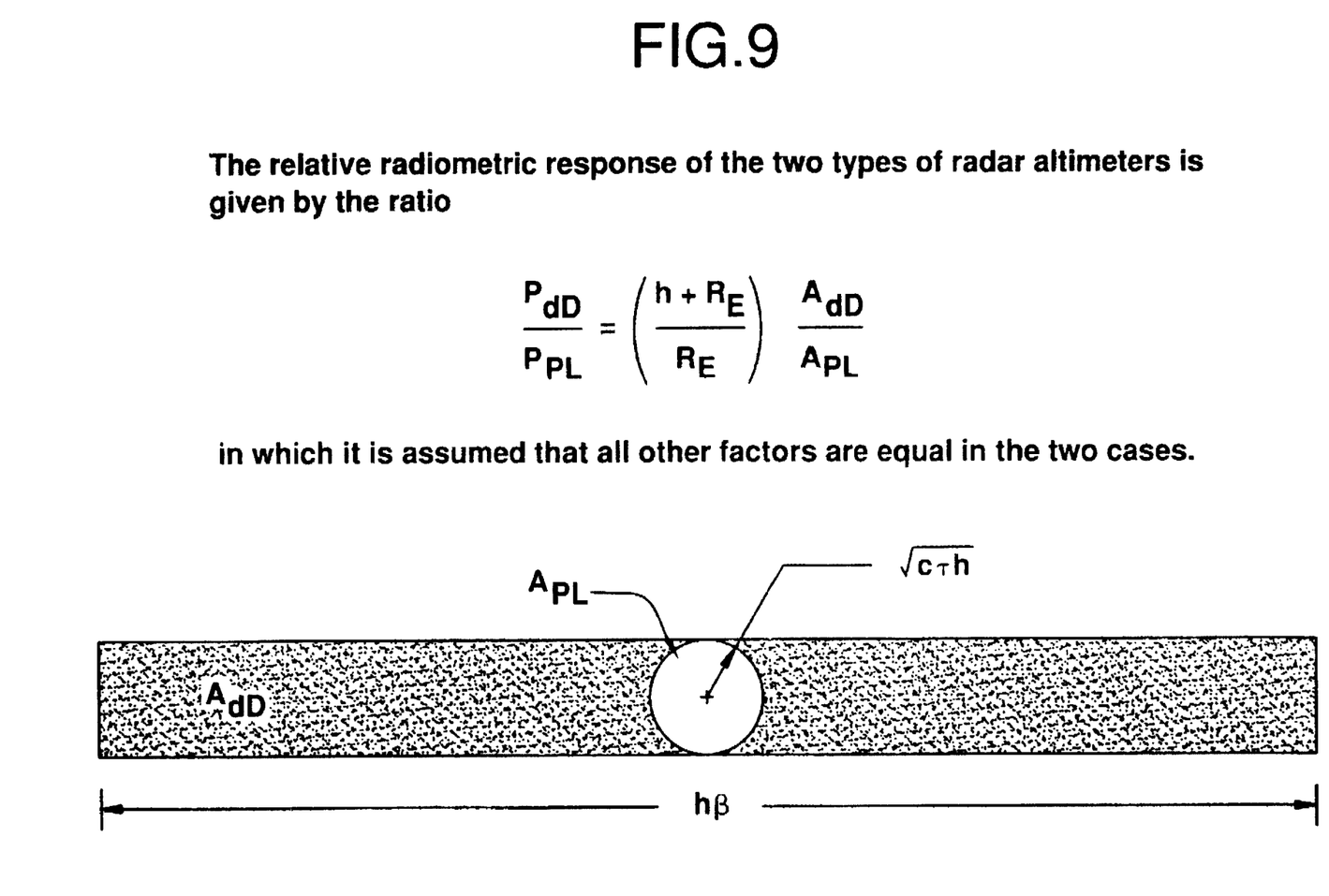
FIG. 9 is a diagram which compares the relative radiometric integration areas of two types of radar altimeters, the rectangular area shown in the figure depicting the larger integration area for the delay/Doppler altimeter of the invention.

Reference is made to FIG. 8 for a clearer understanding of the magnitude in gain improvement that is available when using apparatus according to the present invention. For further illustration, a comparison will be made with a conventional radar altimeter of the TOPEX/Poseidon spacecraft type. The TOPEX/Poseidon spacecraft carries a radar altimeter TOPEX that was developed by The Johns Hopkins University/Applied Physics Laboratory for measuring global and sea surface topography [Marth et al. 1993].

Referring to FIG. 8, it will be understood that the radius of the pulse-limited circle 44 shown in FIG. 7a is approximately one-tenth of the antenna bandwidth, which corresponds to the scale of FIGS. 7a and 7b. The altimeter response functions are shown in FIG. 8, each normalized with respect to their peak value. The relative radiometric performance as a function of delay time is given by the ratio of the two response functions. The two response functions are depicted by the plot shown in FIG. 8. The results show that the radiometric response of the delay/Doppler radar altimeter of the present invention is more than ten times greater at the desired altitude mark than the response of a conventional radar altimeter. Moreover, these conclusions from the relative radiometric response analysis are reinforced by observing in FIG. 9 that the relative gain advantage of the delay/Doppler radar altimeter is in direct proportion to the ratio of the effective area $A_{dD}$ to the area $A_{PL}$ of respective signal integrations.

Although the invention has been described and illustrated in detail, it is clearly understood that the same is by way of illustration and example only.

What is claimed is:

1. A delay compensated Doppler radar altimeter for determining the elevation of successive ground scatterers scanned from an above-ground moving platform having when in motion an along-track direction relative to the scatterers, said altimeter comprising:

means for providing a downwardly directed illuminating wavefront;

means for receiving reflected signals from the scatterers returned to the altimeter;

means for coherently processing the returned signals;

means for introducing a range curvature correction in said coherently processing means;

means for converting radar range to elevation for the scatterers located within the region under illumination; and means for combining the ranges measured for each of the scatterers over an illumination history.

2. The altimeter of claim 1, wherein said platform is a satellite.

3. The altimeter of claim 1, wherein said range curvature correction means uses an algorithm which subtracts from an indicated range of all scatterers at all points on its along-track range history an amount equivalent to an extra range caused by off-nadir viewing in the along-track direction.

4. The altimeter of claim 1, wherein the equivalent distance from the moving platform to each of the scatterers is made equal to a minimum range at nadir thereby eliminating the range curvature of a profile of each of the scatterers over an entire illumination history.

5. The altimeter of claim 1, wherein said means for combining several range measurements for each of the scatterers over the illumination history to form a composite range measurement.

6. The altimeter of claim 4, including means for compensating for the curvature of a wavefront illuminating each of the scatterers whereby the entire along-track history from each and every reflection may be used for elevation estimation.

7. A method in a delay-Doppler radar altimeter for determining the elevation of successive ground scatterers scanned from an aerial moving platform having when in motion an along-track extension relative to the scatterers, the method comprising the steps of:

a. downwardly directing from said aerial moving platform an illuminating wavefront having non-zero extension in an along-track direction for illuminating a surface;

b. radiating a wavefront which impinges on the scatterers on the illuminated surface, giving rise to reflected signals returned to and received by the delay-Doppler radar altimeter;

c. coherently processing the returned signals from each of the scatterers;

d. introducing a range curvature correction to the processed returned signals to make an equivalent distance from said aerial moving platform to each of the scatterers equal to a zero-Doppler frequency radar range for each of the scatterers thereby eliminating a range curvature of a profile of each of the scatterers over an entire illumination history; and e. combining the ranges measured for each of the scatterers over the entire illumination history.

8. The method of claim 7, wherein said aerial moving platform is a satellite.

9. The method of claim 7, wherein said step d. comprises multiplying, by a known phase function, all data in a delay/Doppler domain.

10. The method of claim 7, wherein step d. comprises shifting a range position of each of the scatterers to be equal to a minimal range of zero-Doppler frequency.

11. The method of claim 10, wherein the minimal range is attained when said aerial moving platform is directly overhead each of the scatterers.

12. The method of claim 7, wherein said step e. comprises combining the ranges measured for each of the scatterers at all Doppler frequencies to form a multi-look range estimate for determining a nadir range.

13. The method of claim 7, further comprising the step of providing additional Doppler frequency shifting to eliminate a difference between nadir direction and zero-Doppler direction caused by vertical velocity of the radar altimeter.

14. An altimeter according to claim 1, wherein said means for combining includes memory means.

15. A delay-Doppler radar altimeter comprising:

means for outputting an illuminating wavefront;

a plurality of scatterers, each returning an echo within the illuminated wavefront;

memory means for receiving and storing the echo from each of said scatterers within the illuminating wavefront;

fast Fourier transform means for obtaining a Doppler frequency on echoes stored in said memory means;

correction means for applying a phase delay;

multiplier means for multiplying said Doppler frequency with said phase delay; and inverse fast Fourier transform means for shifting the range of each of said scatterers at all Doppler frequencies to be equal to that at zero Doppler frequency and outputting data in parallel.

16. A method for providing compensation in a delay-Doppler radar altimeter, said method comprising the steps of:

a) illuminating a plurality of ground scatterers;

b) receiving echoes from each of the plurality of ground scatterers;

c) collecting and storing the echoes in memory means;

d) applying a fast Fourier transform to the echoes stored in the memory means to obtain a two dimensional array of data in a delay-Doppler domain;

e) compensating for curvature;

f) applying an inverse fast Fourier transform for recovering range measurements; and g) applying an inverse fast Fourier transform for coinciding along-track measurement positions with original scatterer locations.

17. A method for providing compensation in a delay-Doppler radar altimeter, said method comprising the steps of:

a) illuminating an area with a wavefront from an aerial device;

b) eliminating relative delay curvature associated with energy reflected by scatterers within the area illuminated by the wavefront;

c) Doppler shifting each reflection from the scatterers to equalize the range for each of the scatters over an illumination history to a minimum range experienced when relative velocity between the aerial device and ground is zero; and d) combining the equalized reflections so that an entire along-track history is used for elevation estimation.

* * * * *